L. F. A. LEGOUGE.
Scraping-Tool.
No. 202,444. Patented April 16, 1878.
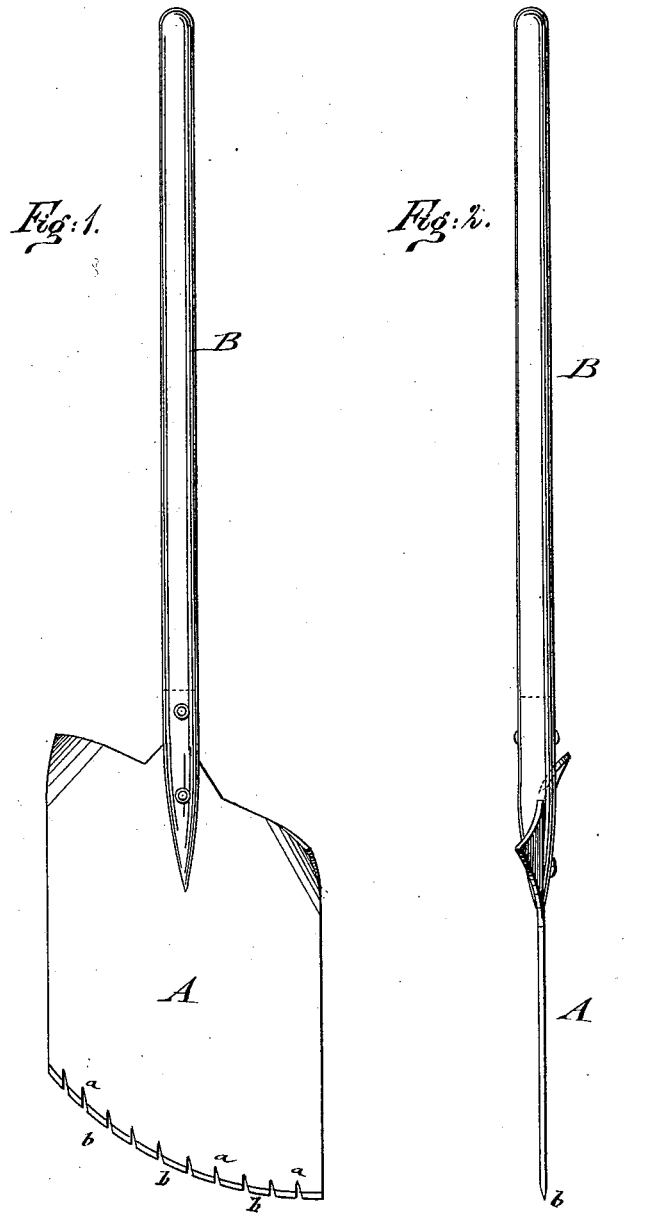

UNITED STATES PATENT OFFICE.

LOUIS F. A. LEGOUGE, OF ST. GEORGES-LA-TRÉTOIRE, FRANCE.

IMPROVEMENT IN SCRAPING-TOOLS.

Specification forming part of Letters Patent No. 202,444, dated April 16, 1878; application filed December 8, 1877.

*To all whom it may concern:*

Be it known that I, LOUIS F. A. LEGOUGE, of St. Georges-la-Trétoire, in the Republic of France, have invented a new and Improved Scraping-Tool, of which the following is a specification:

In the accompanying drawing, Figure 1 represents a front view, and Fig. 2 a side view, of my improved scraping-tool.

Similar letters of reference indicate corresponding parts.

The object of this invention is to furnish an improved hand-scraper by which the roads and ways in parks and gardens may be kept clean of grass and weeds, and which may also be used in place of a hoe as a garden implement for the cutting of weeds, and in the cultivation of flowers and vegetables.

The invention consists of a blade with convex cutting-edge, which is notched or recessed, so as to form cutting-teeth.

Referring to the drawing, A represents the blade of my improved scraping-tool, and B the handle of the same. The blade A is made of a flat piece of metal, having a convexly-curved face-edge, that is sharpened and divided by V-shaped notches or recesses $a$ into a number of teeth, $b$, that serve to cut or shear off the grass and weeds close to the ground. The scraper is operated by a forward and backward motion, and worked without fatigue at both sides, as no stooping down and but little effort is required. The scraper may also be employed with advantage in gardening, as vegetables and flowers may be cultivated very close without danger.

By using a handle of greater length, the work may be done at a good distance, so as to avoid the trampling of the ground, while with a small handle it may be used as a hand implement by ladies for cultivating their flowers.

I am aware that a tapered blade with front as well as lateral teeth is not new, as also a V-shaped hoe, both for scraping weeds, but my blade is round or crescent-shaped on its edge, while the blade and handle are in the same plane, so that it can be reversed and used for digging, scraping, and shoveling off the weeds.

What I claim is—

A tool consisting of blade A and handle B, both being in the same plane, and the edge of blade being notched and convexly curved, as shown and described.

LOUIS F. A. LEGOUGE.

Witnesses:
PAUL GOEPEL,
C. SEDGWICK.